Feb. 17, 1925.  
J. U. MANISCHEWITZ  
1,526,357

APPARATUS FOR DATING ARTICLES FOR MANUFACTURE

Filed Feb. 21, 1922    2 Sheets-Sheet 1

Inventor:
Jacob U. Manischewitz,
By *Walter F. Murray*
    His Attorney.

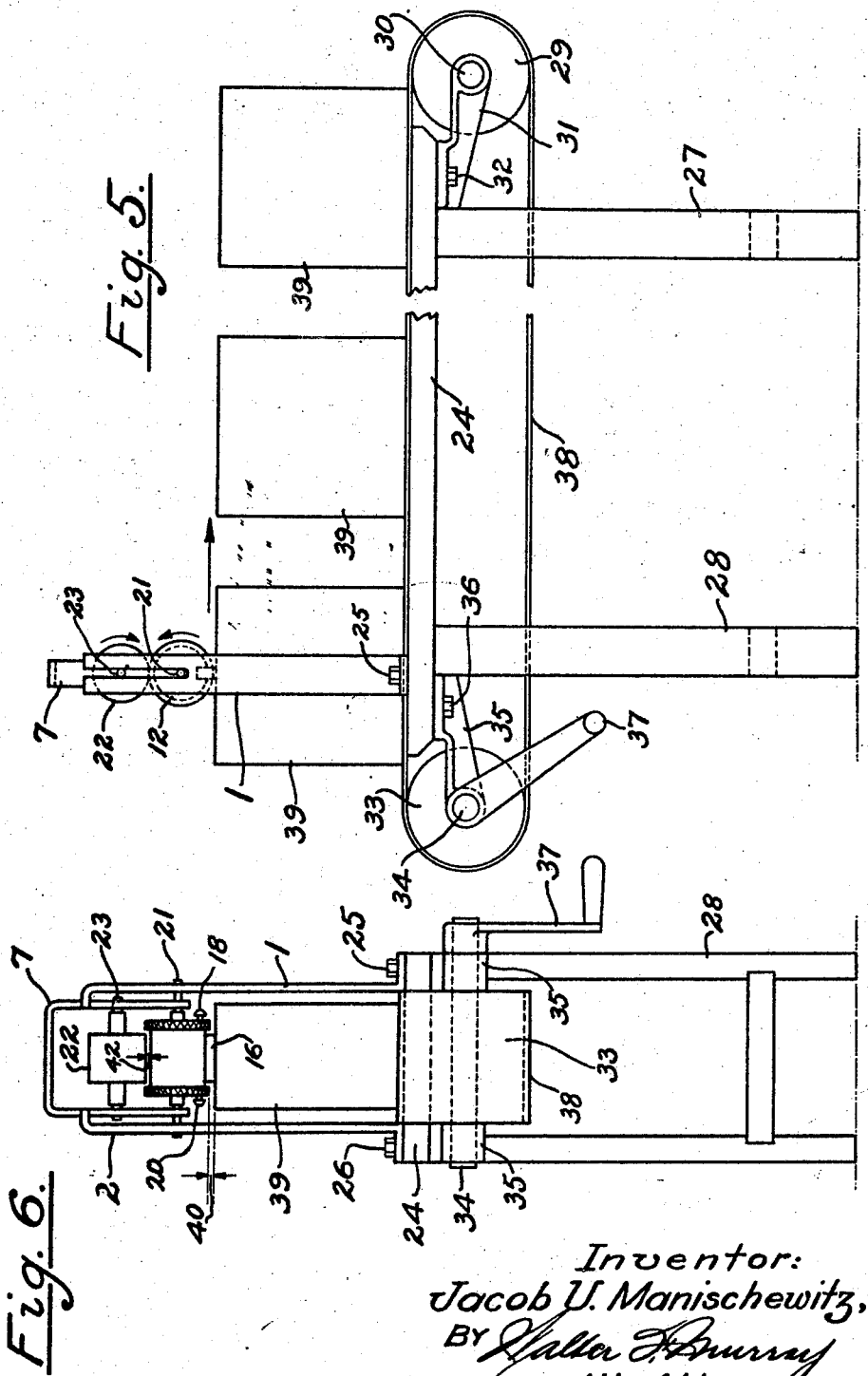

Patented Feb. 17, 1925.

1,526,357

UNITED STATES PATENT OFFICE.

JACOB U. MANISCHEWITZ, OF CINCINNATI, OHIO, ASSIGNOR TO THE B. MANISCHE-WITZ COMPANY, OF CINCINNATI, OHIO, A CORPORATION OF OHIO.

APPARATUS FOR DATING ARTICLES FOR MANUFACTURE.

Application filed February 21, 1922. Serial No. 538,356.

*To all whom it may concern:*

Be it known that I, JACOB U. MANISCHEWITZ, a citizen of the United States of America, and a resident of Cincinnati, in the county of Hamilton and State of Ohio, have invented a new and useful Improvement in an Apparatus for Dating Articles for Manufacture, of which the following is a specification.

My invention relates to an apparatus for dating articles of manufacture while they are moving or traveling on an endless carrier or similar device, on which the dating is accomplished by frictional contact with the articles of manufacture, and without reference to any direct time or spacing.

An object of my invention is to stamp an identification mark or code-word on articles or cartons by a simple and effective method without any positive-operated or manually-operated means.

Another object of my invention is to provide a device of the class described, that is simple and efficient in construction and operation.

These and other objects are accomplished by the means described herein and disclosed in the accompanying drawings, in which Fig. 1 is an assembly of the friction and ink rolls, with a partial view of the side supporting members, all of which form details of my invention.

Fig. 5 is a conventional view of a conveyor having mounted on it a marker embodying my invention.

Fig. 6 is an end view of the conveyor shown in Fig. 5.

Figure 1:
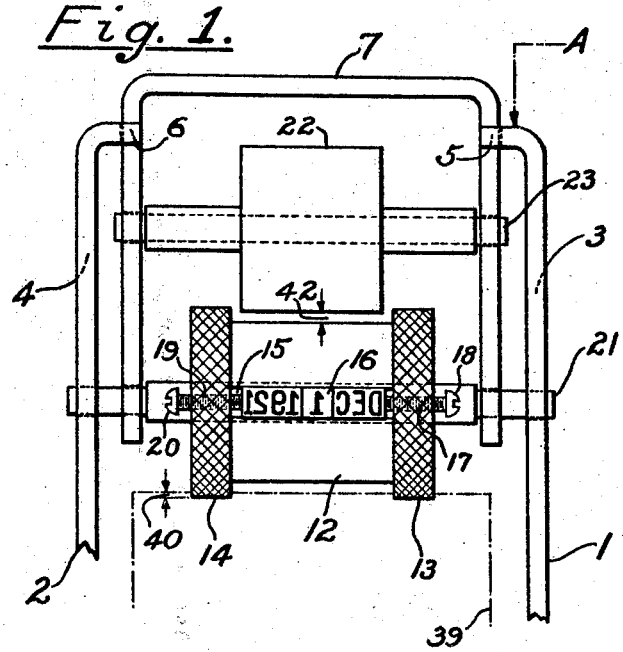
Figure 2:
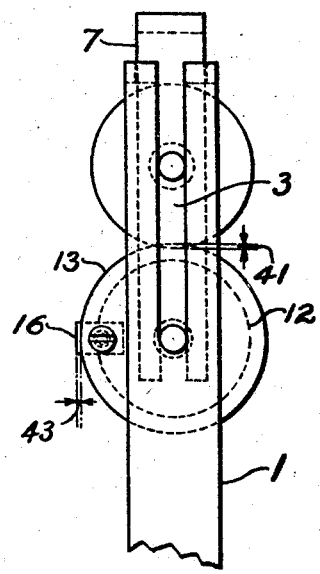
Fig. 2 is an end view of the mechanism shown in Fig. 1.
Figure 3:
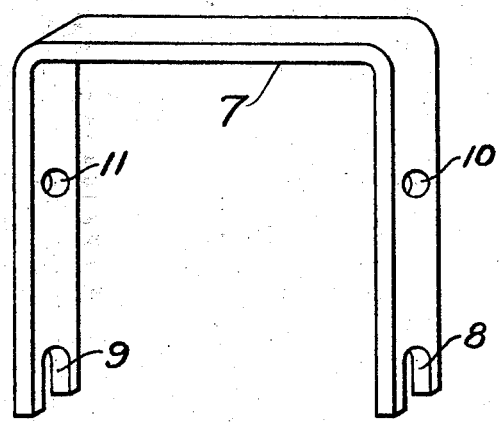
Fig. 3 is a perspective view of a frame forming a detail of my invention.
Figure 4:
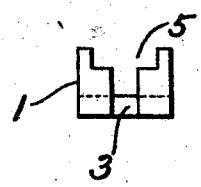
Fig. 4 is a plan view of a side supporting member forming a detail of my invention.

Referring to the drawings, 1 and 2 denote vertical side bars or supporting members having turned upper ends whereby opposed shoulders or arms are formed, the side bars being provided at their upper ends with slots 3 and 4, respectively. These slots 3 and 4 have transversely enlarged portions 5 and 6 at their upper and inner extremities, which serve as guide ways for a frame 7. This frame 7 is shown formed in the shape of an inverted U, the arms of which are provided with slots 8 and 9 at their free ends, and also are provided intermediate their ends with bearing holes 10 and 11.

A roll 12 is provided with flanged outer ends 13 and 14. I have shown knurled flanges, so that they may offer resistance and hence rotate by frictional contact with moving articles. These flanges may be covered with rubber or other material that offers resistance to the moving articles. In roll 12 is a slot 15 for the purpose of holding suitable type 16, comprising the letters or numerals to stamp the desired identification mark on the articles of manufacture. Through the end 13 is a tapped hole 17, in which works a clamping screw 18. Through the end 14 is a tapped hole 19 in which works a clamping screw 20. Screws 18 and 20 serve to hold the type 16. Roll 12 is revolubly mounted on a shaft 21. This shaft 21 fits loosely in the lower end of slots 3 and 4 of the side supporting members 1 and 2. The frame 7 is slidably mounted in the guide ways 5 and 6 and the shaft 21 extends loosely into the slots 8 and 9 of the frame 7.

An ink roll 22 is mounted on a shaft 23. This shaft 23 is rotatably mounted in holes 10 and 11 of the frame 7.

My improved apparatus for dating articles may be used in connection with any carton sealing machine or similar device, but for purpose of effecting clearness and simplicity in the drawings accompanying the specifications, I have shown it incorporated with a manually-operated endless conveyor belt 38 above which the vertical side bars 1 and 2 mounted on a supporting table or board 24, extends. The side bars are screwed or bolted upon the table by means of the screws or bolts 25 and 26. Board 24 is provided with suitable legs 27 and 28. A roller 29 is rigidly mounted on a shaft 30, and said shaft 30 is rotatably mounted on brackets 31. These brackets 31 are securely mounted to the board 24 by screws or bolts 32. At the other end of the board 24 is a roller 33, mounted on a shaft 34, and rotatably mounted on brackets 35. These brackets 35 are secured to the board 24 by means of screws or bolts 36. A handle 37, or any other suitable means, is employed to actuate the endless belt 38, on which belt are placed the articles to be stamped by the dating apparatus. I have shown cartons 39 as being the articles placed on the belt 38.

In practice, my invention operates as follows: Cartons 39 are carried under the rolls 21 by any suitable conveyor, for example such as the belt 38. The engagement of the carton upon knurled flanges causes the roll to rotate at the same peripheral velocity as the carton 39 moves, due to the frictional contact with said carton. The diameter or perimeter of the flanges are such that the development of their peripheries is approximately equal to the length of the carton. As the friction roll 12 rotates, the type 16 mounted in the slot 15 will pass under and frictionally engage the ink roll 22, raising said ink roll a distance 41, and cause said ink roll to rotate at an equal velocity, imparting to the type a supply of ink, and then the type 16 will transfer the ink impression to the cartons 39. The type 16 projects beyond the peripheral edges of the flanges 13 and 14 a distance 43, so that a legible ink transfer is effected. It will be noted that when the type 16 engages the carton the entire weight of the ink roll 22, shaft 23 and the frame 7 rest on the shaft 21, and the weights of these several parts are proportioned to give the ink impression correct legibility. Ink is supplied to the ink roll 22 by any suitable means, such as by applying it with a brush.

As the carton 39 passes under the roll 12, said roll, with its coacting shaft 20, will be raised in the slots 3 and 4 a slight distance 40, so that the necessary weighted pressure, actuated by gravity, will be imparted to the type 16 as the impression is made on the carton 39. Similarly, the type 16 in the slot 15 of the friction roll 12 will raise the ink roll 22 a distance 41, as it becomes frictionally engaged therewith in operative position, and this vertical lift is of such a distance that the ink roll 22 will not touch the periphery of the roll 12, as the length of the slots 8 and 9 in the projecting members of the frame 7 serve to limit the downward movement of said frame 5 and all coacting parts, when said ink roll 22 is in its lowest position, a distance designated by 42.

Having thus described by invention, what I claim as new, is—

1. In an apparatus for dating articles of manufacture, a friction roll provided with type, a shaft supporting said friction roll, an ink roll above the friction roll, a slotted frame member for said ink roll slidably receiving the shaft in the slots and side supporting members provided with slots into which slots the shaft extends, the walls of the last mentioned slots being adapted to limit the downward movement of said friction roll shaft.

2. In an apparatus for dating articles of manufacture, a friction roll provided with type, a shaft supporting said friction roll, an ink roll above the friction roll, a frame for said ink roll slidably mounted upon said shaft, and side supporting members provided with slots into which the shaft and frame extend, the slots being adapted to limit the downward movement of said friction roll shaft and guide the ink roll frame.

3. An apparatus for dating articles of manufacture, comprising a shaft, bars, a friction roll having enlarged flanges, revolubly mounted on the shaft and slidably mounted on the bars, the roll having a slot adapted to accommodate type, means to hold the type, a frame slidably supported and guided by the shaft, an ink roll rotatably mounted on the frame, the type, friction roll and ink roll bearing a relation such that the type may engage the ink roll and that the ink roll cannot touch the periphery of said friction roll.

4. In a device of the class described the combination of a conveyor adapted to carry articles to be marked, side bars extending above the conveyor, a frame slidable upon the bars toward and away from the conveyor, an ink roll carried by the frame, and a marker roll reciprocally mounted on the side bars capable of movement toward and away from the conveyor adapted to engage the ink roll and the articles to be marked and guiding the frame.

5. In a device of the class described the combination of a conveyor adapted to carry articles to be marked, side bars extending above the conveyor and having substantially aligned parallel slots, a frame slidable upon the bars in parallelism with the slots in the bars, an ink roller mounted on the frame, and a marking roller reciprocally mounted in the slots in the bars adapted to engage the ink roll and the articles to be marked and guiding the frame.

6. In a device of the class described the combination of side bars having substantially vertical slots and vertical guide ways in their upper ends, a revoluble shaft mounted reciprocally in the slots, a frame reciprocally mounted in the guide ways and engaging the shaft, the frame being capable of reciprocation independently of the shaft, a type roller mounted on the shaft, and an ink roller revolubly mounted on the frame adapted to engage the type.

7. In a device of the class described the combination of parallel bars having aligned parallel slots, shoulders formed at the upper ends of the bars having guide ways formed therein, a frame comprising arms slidable thru the guide ways and having slots extending longitudinally thereof, an ink roll mounted revolubly between the arms of the frame, a shaft mounted reciprocally in the slots in the bars and arms, and a marking roll mounted on the shaft adapted to engage the ink roll.

8. In a device of the class described the combination of parallel bars having aligned parallel slots, shoulders formed at the upper ends of the bars having guide ways formed therein, a frame comprising arms slidable thru the guide ways and having slots extending longitudinally thereof, an ink roll mounted revolubly between the arms of the frame, a shaft mounted reciprocally in the slots in the bars, friction flanges carried by the shaft and spaced at opposite ends of the ink roll and bearing such relation to the ink roll so as not to engage the same, and type carried between the flanges adapted to engage the ink roll.

In testimony whereof, I have hereunto subscribed my name this twentieth day of February, 1922.

JACOB U. MANISCHEWITZ.